Sept. 22, 1964     J. U. DALY ET AL     3,149,455

CONDITION RESPONSIVE POWER ELEMENTS

Filed Nov. 6, 1963     2 Sheets-Sheet 1

INVENTOR.
JAMES U. DALY
GEORGE P. SALIARIS
BY
*ATTORNEY*

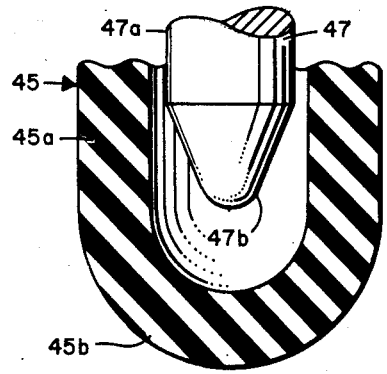
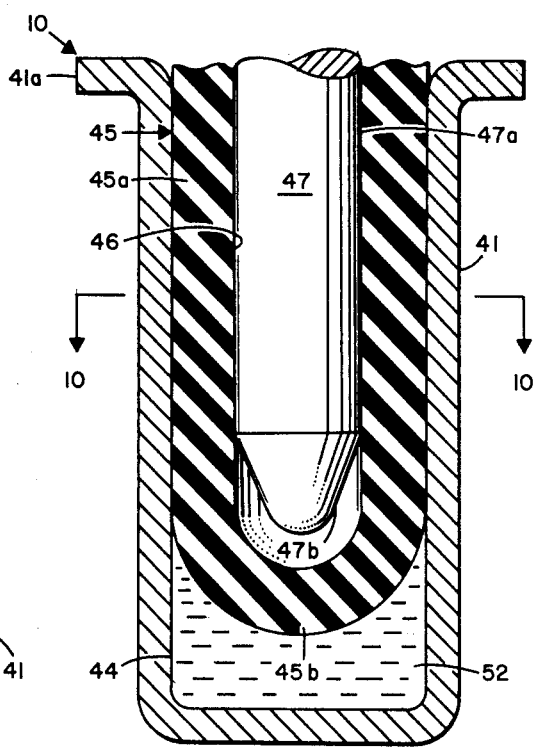
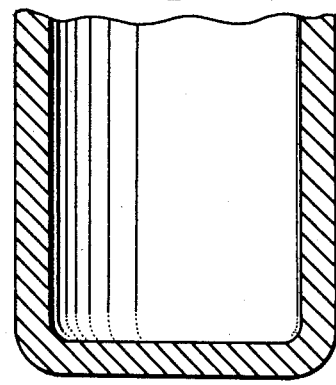
Fig. 11
Fig. 9
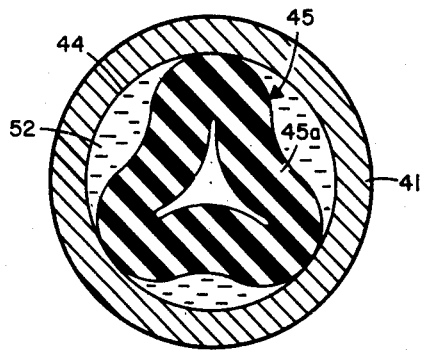
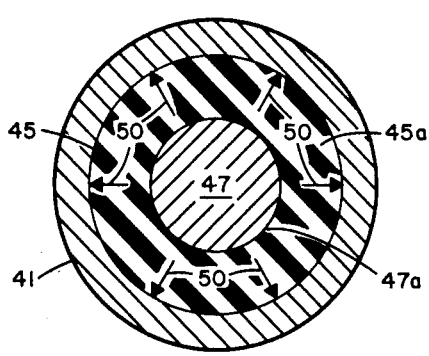
Fig. 12
Fig. 10

_United States Patent Office_ 3,149,455
Patented Sept. 22, 1964

3,149,455
CONDITION RESPONSIVE POWER ELEMENTS
James U. Daly, Columbus, and George P. Saliaris, Worthington, Ohio, assignors to Ranco Incorporated, Columbus, Ohio, a corporation of Ohio
Filed Nov. 6, 1963, Ser. No. 321,798
8 Claims. (Cl. 60—23)

This invention relates to condition responsive power elements and more particularly to improvements in power elements of the type comprising an elastomeric sleeve or sock in which is reciprocably received an end portion of a rod so that when the sock is hydraulically squeezed, for example by a thermally expansible material such as a fusible wax, the rod is axially propelled and its motion may be utilized for operation of valves, switches and the like.

Known power elements of this type, often referred to in the art as "squeeze-push" power elements, have been subject to excessive friction and wear or scuffing between the rod and the sock because of difficulties in maintaining lubricants therebetween under the hydraulic pressures experienced in use, thereby resulting in short life and loss of uniformly repeatable operating characteristics.

It is an important object of this invention to provide an improved squeeze-push power element which effectively reduces the loss of lubricant from between the rod and the elastomeric sock, thereby increasing the useful life of the sock and rod and improving the uniformity of repetitive operating characteristics of the power element.

It is another object of this invention to reduce the sliding friction between the rod and the sock by minimizing the radial forces exerted by the sock on the rod without affecting the axial driving forces thereon, whereby the efficiency of the power element is materially increased, as are the useful life and the sensitivity of response thereof.

Another object of this invention is the provision of an improved squeeze-push power element which exhibits the advantages mentioned in the preceding paragraphs through the provision of an elastomeric sock which, when relaxed, has a bore or inside diameter which is larger than the diameter of the rod therein by a predetermined amount, and the sock side wall being hydraulically or mechanically circumferentially compressed toward engagement with the cylindrical portion of the rod so that upon collapsing of the portion of the sock which exerts an axial force on the end of the rod, the circumferentially compressed sock wall exerts outwardly directed forces which balance the inwardly directed forces acting thereon, whereby the cylindrical portion of the rod is shielded therefrom and lubricant between the rod and sock wall remains intact to prevent binding and scuffing therebetween. The circumferential compression of the sock wall may be effected solely by hydraulic action in response to condition changes or, the sock may be prestressed by compression into a rigid annular member, thereby reducing "head effect" or the amount of condition change which must be experienced before collapsing of the sock and propulsion of the rod begins.

Other objects and advantages of this invention will become apparent from the following detailed description of a preferred embodiment thereof read in conjunction with the accompanying sheets of drawings forming a part of this specification, and in which:

FIG. 9 is a vertical sectional view of a modified power element embodying this invention;

FIG. 10 is a sectional view taken along line 10—10 of FIG. 9;

FIG. 11 is a fragmentary exploded view illustrating components of the power element of FIG. 9 before assembly; and FIG. 12 is a sectional view illustrating the manner of collapse of the sock of the power element of FIG. 9.

Figure 1:
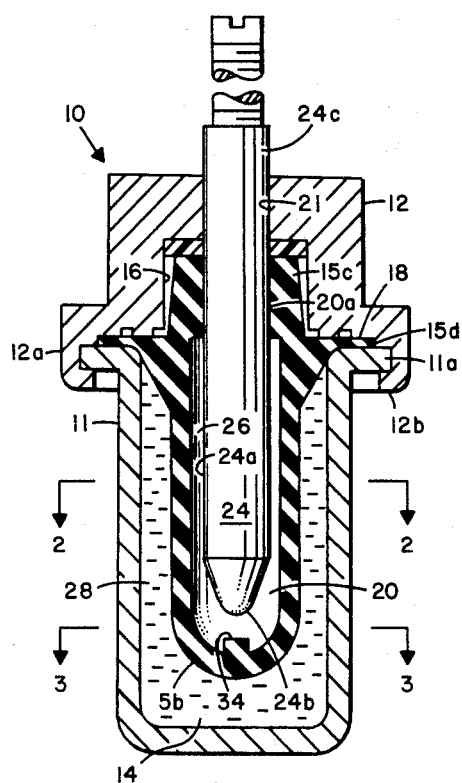
FIG. 1 is a vertical sectional view of an improved power element embodying this invention.
Figure 2:
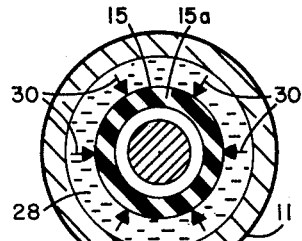
FIG. 2 is a sectional view taken along line 2—2 of FIG. 1.
Figure 3:
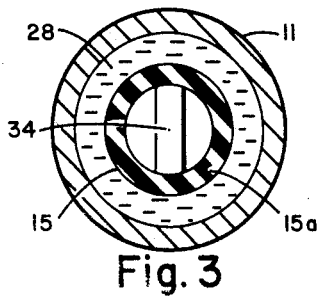
FIG. 3 is a sectional view taken along line 3—3 of FIG. 1.

In the form of the invention illustrated in FIGS. 1–8 of the drawings, there is provided a power element 10 which is responsive to changes in temperature to provide actuating movement for valves, switches, or the like. The power element 10 comprises a rigid metal cup 11 having an outwardly directed rim or flange 11a, and a cover member 12 having a recess defined by a cylindrical wall portion 12a in which the flange 11a is received and retained by crimping of the cylindrical wall portion as shown at 12b. The cup 11 defines a hydraulic compression chamber 14 in which is disposed a hollow sleeve or sock 15 formed of a resiliently flexible elastomeric material such as soft rubber or the like.

The sock 15 comprises a cylindrical wall 15a having an outside diameter substantially less than the inside diameter of the cup 11 so as to define a space therebetween. The wall 15a extends from a generally hemispherical end wall 15b at one end of the sock and merges at its other end with a thickened neck portion 15c extending into a recess 16 of the cover member 12. The sock 15 further comprises a radially extending flange 15d which is tightly clamped between the cup flange 11a and an annularly grooved shoulder 18 of the cover member to provide a fluid tight seal for the hydraulic chamber 14.

The cylindrical sock wall 15a defines an interior cavity or bore 20 having a reduced portion 20a extending through the neck portion 15c of the sock and in registration with an opening 21 in the cover member 12. Disposed between the neck portion 15c and the cover member 12 is a sealing washer 22 formed of a friction reducing material such as polytetrafluoroethylene plastic.

Extending through the opening 21, washer 22, neck portion 15c, and into the cylindrical bore 20, is a rod 24 having a smooth cylindrical surface 24a and terminating in a smoothly tapered end 24b. The other end 24c of the rod 24 extends externally of the cover member 12 and may be threaded, as shown, for connection with a valve, switch, or the like to be operated by the power element 10. It will be noted at this point as an important feature of this invention, that the diameter of the cylindrical portion of the bore 20 is appreciably greater than the diameter of the smooth cylindrical surface 24a of the rod 24 therein, so that an annular space 26 appears between the cylindrical wall 15a of the sock 15 and the rod 24. A small quantity of lubricant (not shown) is present in the space 26 and on the rod 24 and the inner surface of sock wall 15a.

The hydraulic pressure chamber 14, that is to say the space defined between the cup 11 and the sock 15, is filled with a heat fusible material 28 such as paraffin which fuses and expands at predetermined temperatures to produce hydraulic pressure changes within the chamber 14.

Figure 5:
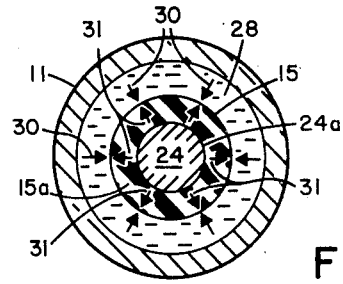
FIG. 5 is a sectional view taken along line 5—5 of FIG. 4.

As hydraulic pressure increases in the chamber 14, the fusible material 28 exerts compressive forces uniformly at all points of the sock 15 as indicated in FIG. 5 by the vector arrows 30, which forces circumferentially and radially compress the sock wall 15a uniformly toward the rod 24. As the cylindrical wall 15a of the stock 15 is compressed, the wall thickens and, because of its resiliency, exerts outwardly directed radial forces, indicated by vector arrows 31, which tend to balance the inwardly directed forces 30.

Figure 4:
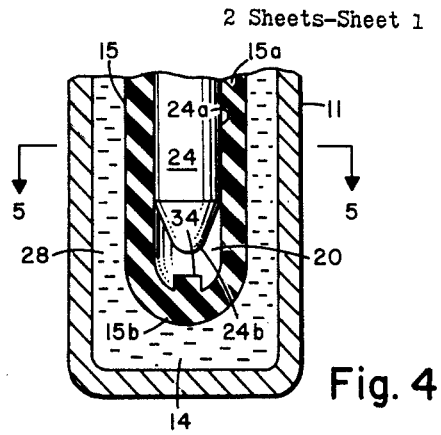
FIG. 4 is a fragmentary vertical sectional view of the power element of FIG. 1, illustrating compression of the sock portion thereof during operation.
Figures 6, 7:
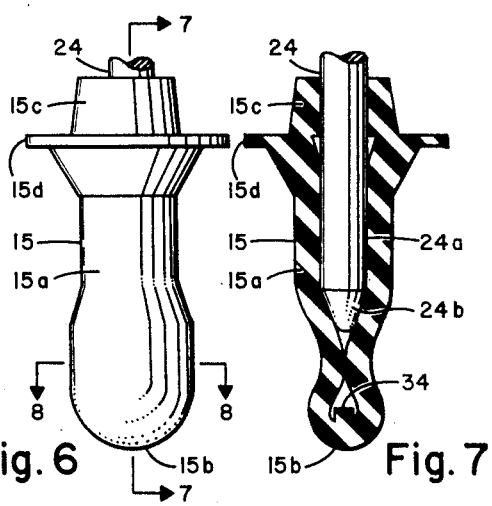
FIG. 6 is an elevational view of the sock after collapse of a portion thereof.
FIG. 7 is a sectional view taken along line 7—7 of FIG. 6.
Figure 8:
FIG. 8 is a sectional view taken along line 8—8 of FIG. 6.

The wall 15a of the sock 15 will be uniformly compressed until it just engages the rod 24 as illustrated in FIGS. 4 and 5. At the time of engagement of the sock wall 15a with the rod surface 24a, collapse of the lower portion of the sock is imminent, and continued increase in compressive force by the hydraulic material 28 will cause the portion of the sock 15 below the rod surface 24a to collapse as shown in FIGS. 6, 7, and 8, the collapsing of the sock acting on the tapered end 24b of the rod 24 to provide an axial propelling force.

Because the forces 31 of the radially and circumferentially compressed sock wall 15a tend to balance the forces 30, the lubricant between the rod 24 and the wall 15a will not be squeezed from therebetween but will remain to reduce friction between the rod 24 and sock 15. Because the lubricant does remain and is not squeezed out, the power element 10 will retain constant characteristics of operation throughout many repetitions. Moreover, because the forces 31 resulting from compression of the sock 15 prevent the sock from frictionally gripping the rod 24 on the cylindrical surface thereof, the power element 10 is all the more responsive to minute changes in temperature than power elements available heretofore.

In order to prevent any likelihood of the closed end 15b of the sock 15 from collapsing in an inverted or reentrant fashion rather than to a flattened condition, there is provided a transverse rib 34 projecting inwardly from the end wall 15b. The rib 34, best shown in FIGS. 1 and 3, effectively prevents such inversion and promotes the collapsing of the sock 15 at a predetermined temperature and pressure of the hydraulic fusible material 28.

The space 26 between the rod surface 24a and the sock wall 15a when the latter is relaxed will differ with rod diameter and thickness of the sock wall. In one specific example, in which the diameter of rod 24 is 0.156 inch and the sock wall 15a has a relaxed thickness of .048 to .050 inch, the annular space 26 has a radial dimension between the surface 24a and the sock wall 15a of .008 to .010 inch. Thus, the ratio of the diameter of the bore when relaxed to the diameter of the rod is in the range of from 174:156 to 178:156. The space 26 is appreciably greater than would occur with manufacturing tolerances for the rod and sock which can easily be maintained within plus or minus .002 inch.

The critical factor to be observed in the practice of the invention is that when the sock is relaxed, the sock bore must be greater than the rod diameter by such an amount that upon uniform circumferential compression of the sock to reduce its bore to equal the rod diameter, collapse of the sock will be imminent with further compression.

Referring now to FIGS. 9 through 12, there is illustrated therein a modified power element 40 comprising a cup 41 having a flange 41a for connection with a suitable cover member such as cover member 12 of the previous example. The cup 41 defines a hydraulic compression chamber 44 and receives a hollow, elongated sock 45 having a cylindrical side wall 45a, a hemispherical end wall 45b, and otherwise similar to the previously described sock 15. The cylindrical sock wall 45a defines a central cavity or bore 46 in which is reciprocably received a rod 47 having a smooth cylindrical surface 47a terminating in a tapered end 47b.

When the sock 45 is in a relaxed state prior to assembly in the cup 41, as shown in FIG. 11, the diameter of the bore 46 is greater than the diameter of the cylindrical surface 47a of the rod 47 by a predetermined amount which will make collapse of the sock 45 imminent upon circumferential compression sufficient to reduce the diameter of bore 46 to equal the diameter of rod surface 47a. During assembly, the sock 45 is circumferentially compressed to be received in the cup 41 which maintains the sleeve 45 in a prestressed, circumferentially compressed condition in which the diameter of the bore 46 is reduced to just equal the diameter of the rod surface 47a, with a film of lubricant (not shown) therebetween. In this condition, illustrated in FIGS. 9 and 10, the prestressed, circumferentially compressed sock 45 exerts outwardly directed forces 50 on the inner surface of the cup 41 and the rod 47 is free of constricting forces thereon.

The closed end 45b of the stock 45 is spaced from the closed end of the cup 41, leaving a portion of the hydraulic compression chamber 44 which is filled with a fusible and thermally expansible hydraulic material 52. Expansion of the material 52 upon increases in temperature experienced thereby, will result in an increase in hydraulic pressure in chamber 44 which will cause the portion of the sock 45 extending beyond the cylindrical surface 47a of the rod 47 to collapse and exert an axial propelling force on the rod end 47b. Because the sock 45 is prestressed by circumferential compression maintained by the cup 41, expansion of the hydraulic material 52 will be immediately available to effect collapsing of the portion of the sock 45 beyond surface 47a, thereby materially reducing the "head effect" which is not desirable in all applications of the power elements. The rod surface 47a of the power element 40, however, like the rod surface 24a of the power element 10, will be shielded from inwardly directed forces by the outwardly acting forces 50 produced by the prestressed, circumferentially compressed sock wall 45a. The power element 40 will therefore retain its lubricant between the sock 45 and the rod 47 and will be characterized by long life and consistent repetitive operation.

Because of the prestressed condition of the sock 45, the collapsing portion thereof will assume a three cusp configuration as illustrated in FIG. 12, this configuration being effective to preclude inversion of the collapsing end 45b.

From the foregoing detailed description of power elements embodying the present invention, it will be appreciated that there has been provided thereby a squeeze-push power element which accomplishes the earlier objects and advantages. Of course, the mentioned dimensions and materials were given by way of example and it will be recognized that the particular dimensions and materials may be varied in accordance with the use to which the power element is to be put, so long as the relationship of the diameter of the bore of the sock when relaxed to the diameter of the cylindrical surface of the rod therein is maintained within a range which will result in a condition of imminent collapse when the sock is circumferentially compressed to reduce the bore diameter to equal the rod diameter. Accordingly, although the invention has been described in considerable detail and with reference to specific power elements embodying the invention, it will be understood that the invention is not limited thereto, but rather the invention includes all those modifications, variations, substitutions, adaptations, and uses as are reasonably embraced by the scope of the claims hereof.

Having described our invention, we claim:

1. A condition responsive power element comprising:
   (a) means defining an hydraulic pressure chamber,
   (b) an elastomeric sock disposed in said chamber and having a central bore of predetermined diameter, said bore opening to the exterior of said chamber, and (c) a rod having an end portion reciprocably received in said bore and having a second predetermined diameter substantially less than said first predetermined diameter of said bore, (d) said sock being radially compressible by hydraulic pressure in said chamber and being collapsible to propel said rod outwardly of said bore upon an hydraulic pressure increase beyond that which will compress said sock and reduce said first predetermined diameter to equal said second predetermined diameter.

2. A condition responsive power element comprising:
(a) means defining an hydraulic pressure chamber,
(b) an elongated elastomeric sock disposed in said chamber and having a cylindrical wall defining a cylindrical central bore of a first predetermined diameter opening through a neck of said sock to the exterior of said chamber, and (c) a rod extending through said neck into said bore, said rod having a smooth cylindrical surface of a second predetermined diameter and terminating in a tapered end within said bore, (d) said second predetermined diameter being appreciably less than said first predetermined diameter so as to define an annular space between said cylindrical wall and said cylindrical surface of said rod, (e) said cylindrical wall being radially compressible toward said rod by hydraulic pressure in said chamber, and said sock being collapsible to produce an axially propelling force on the tapered end of said rod by said hydraulic pressure being balanced by outward radial forces of the compressed cylindrical wall.

3. A condition responsive power element comprising:
(a) a rigid cylindrical cup member,
(b) an elongated elastomeric sock disposed in said cup member and having a cylindrical wall defining a central bore, said sock being circumferentially compressed by said cup so that said bore has a predetermined diameter appreciably less than when said sock is relaxed, and (c) a rod extending into said bore and terminating therein, said rod having a smooth cylindrical surface of a diameter less than the bore diameter of said sock when relaxed and equal to said predetermined diameter when said sock is compressed by said cup, (d) said sock being collapsible to exert an axial propelling force on the end of said rod by hydraulic pressure in said cup in excess of a pressure exerted outwardly on said cup by said circumferentially compressed sock.

4. A condition responsive power element comprising:
(a) means defining an hydraulic compression chamber,
(b) an elongated hollow sock of elastomeric material having a cylindrical wall portion defining a central bore of a first predetermined diameter when said sock is relaxed, said sock being disposed in said hydraulic compression chamber,
(c) a rod extending into said bore and reciprocable therein, said rod having a smooth cylindrical surface of a second predetermined diameter, and (d) lubricant between said rod and said sock, (e) said first predetermined diameter being greater than said second predetermined diameter by such an amount that upon circumferential compression of said sock wall portion to reduce said bore to said second diameter, collapse of said sock is imminent.

5. A condition responsive power element as defined in claim 4 and wherein the ratio of said first diameter to said second diameter is in the range of from 174:156 to 178:156.

6. A thermally responsive power element comprising:
(a) means defining an hydraulic pressure chamber,
(b) an elongated hollow sock of elastomeric material having a cylindrical wall portion defining a central bore of a first predetermined diameter when said sock is relaxed, said sock being disposed in said chamber,
(c) a rod extending into said bore and reciprocable therein, said rod having a smooth cylindrical surface of a second predetermined diameter,
(d) lubricant between said rod and said sock, and (e) a thermally expansible material in said chamber for exerting increasing and decreasing hydraulic pressure on said sock in accordance with temperature increases and decreases,
(f) said sock being collapsible by predetermined hydraulic pressure in said chamber to axially propel said rod,
(g) said first predetermined diameter being greater than said second predetermined diameter by such an amount that upon circumferential compression of said sock wall portion to reduce said bore to said second predetermined diameter, collapse of said sock is imminent.

7. A thermally responsive power element as defined in claim 6 and wherein said means defining said chamber comprises a rigid annular member and sock is circumferentially compressed by said rigid annular member.

8. A condition responsive power element comprising:
(a) means defining an hydraulic compression chamber,
(b) an elongated hollow sock of elastomeric material having a cylindrical wall portion defining a central bore of a first predetermined diameter when said sock is relaxed, said sock being disposed in said hydraulic compression chamber,
(c) a rod extending into said bore and reciprocable therein, said rod having a smooth cylindrical surface of a second predetermined diameter,
(d) lubricant between said rod and said sock,
(e) said first predetermined diameter being greater than said second predetermined diameter by such an amount that upon circumferential compression of said sock wall portion to reduce said bore to said second diameter, collapse of said sock is imminent, and (f) said sock comprising a hemispherical end wall portion including a transverse rib on the inner surface thereof, whereby reentrant collapse of said sock is prevented.

No references cited.